United States Patent
Wada

(10) Patent No.: US 7,382,472 B2
(45) Date of Patent: Jun. 3, 2008

(54) IMAGE FORMING APPARATUS

(75) Inventor: Atsushi Wada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1061 days.

(21) Appl. No.: 10/782,780

(22) Filed: Feb. 23, 2004

(65) Prior Publication Data
US 2004/0169899 A1    Sep. 2, 2004

(30) Foreign Application Priority Data
Feb. 28, 2003    (JP)    ............... 2003-052977

(51) Int. Cl.
*G06F 15/00*    (2006.01)
*G06F 3/12*    (2006.01)
*G06K 1/00*    (2006.01)

(52) U.S. Cl. ................. 358/1.1; 358/498

(58) Field of Classification Search .......... 358/1.1, 358/498, 296, 1.12, 1.14; 271/3.14, 3.15, 271/4.02, 4.03, 10.02, 10.03
See application file for complete search history.

(56) References Cited

U.S. PATENT DOCUMENTS

| | | | |
|---|---|---|---|
| 4,414,887 A * | 11/1983 | Orii | 100/45 |
| 5,010,363 A | 4/1991 | Higashio et al. | 355/206 |
| 6,101,935 A * | 8/2000 | Ohkawa | 101/116 |
| 6,177,977 B1 | 1/2001 | Tanaka et al. | 355/26 |
| 6,185,381 B1 | 2/2001 | Nakahara et al. | 399/21 |
| 6,575,447 B2 * | 6/2003 | Yoshie et al. | 270/58.07 |
| 2003/0016958 A1 | 1/2003 | Wada et al. | 399/45 |

FOREIGN PATENT DOCUMENTS

JP    2-182645    7/1990

* cited by examiner

*Primary Examiner*—Douglas Q Tran
(74) *Attorney, Agent, or Firm*—Fitzpatrick, Cella, Harper & Scinto

(57) ABSTRACT

An engine controller 21 discriminates defective conveyance of a sheet material 2 on the basis of information regarding the presence or absence of the sheet material 2 which is outputted from a TOP sensor 7 and an ejection sensor 17 (S202), discriminates to which one of a plurality of types of defective conveyance the defective conveyance relates, and transmits information regarding the defective conveyance to an image controller 23. If the information regarding the defective conveyance received from the engine controller 21 is information showing the occurrence of a feed delay jam, the image controller 23 transmits a jam clear command to cancel the feed delay jam to the engine controller 21.

12 Claims, 6 Drawing Sheets

IMAGE FORMING APPARATUS

BACKGROUND OF THE INVENTION

1. Field of the Invention

The present invention relates to an image forming apparatus.

2. Related Background Art

In an image forming apparatus which forms an image onto a sheet material, when the sheet material fed from a paper feed cassette or the like is conveyed in the image forming apparatus, there is a case where defective conveyance due to a paper jam, a slip of the sheet material, or the like (hereinafter, called a jam) occurs. When the jam occurs, since an image is not normally formed onto the sheet material, the operation of the image forming apparatus is stopped.

To restart the operation of the image forming apparatus in which the jam has occurred, it is necessary to remove the sheet material which becomes a cause of the jam and is staying in the image forming apparatus. However, to clear such a jam state, it is necessary for the user to open a cover provided for the image forming apparatus, remove the jammed sheet material, and thereafter, close the cover in a state where the sheet material does not stay in the image forming apparatus (for example, refer to Japanese Patent Application Laid-Open No. H02-182645). That is, since the cover provided for the image forming apparatus has been closed, it is regarded that the jammed sheet material in the image forming apparatus has been removed, and the operation of the image forming apparatus is restarted.

However, there is a case where it is not always necessary for the user to open the cover and remove paper in dependence on a type of jam.

For example, in the case where a paper feed roller to feed the sheet materials one by one from the paper feed cassette slips and cannot normally feed the sheet material and an abnormal state where the sheet material does not reach a sensor for detecting the presence or absence of the sheet material after the elapse of a predetermined time from the start of the paper feed by the paper feed roller occurs (hereinafter, such an abnormal state is referred to as a feed delay jam), or the like, although the sheet material can be conveyed and ejected to the outside of the image forming apparatus even if the user does not bother to open and close the cover of the image forming apparatus, it is necessary for the user to bother to open and close the cover in order to clear the jam state.

SUMMARY OF THE INVENTION

The present invention is made in consideration of the above problem and it is an object of the invention to provide an image forming apparatus which can reduce an occasion for the user to bother to execute a jam process.

According to an aspect of the invention, there is provided an image forming apparatus which forms an image onto recording paper, comprising:

an image processing control unit for processing image information from an external apparatus;

an image forming control unit for controlling the image forming apparatus on the basis of a control signal from the image processing control unit;

a conveying unit for conveying the recording paper; and a detecting unit for outputting information regarding the presence or absence of the recording paper which is conveyed by the conveying unit, wherein the image forming control unit discriminates defective conveyance of the recording paper on the basis the information regarding the presence or absence of the recording paper which is outputted from the detecting unit, discriminates which of a plurality of types of defective conveyance the defective conveyance is, and transmits information regarding the defective conveyance to the image processing control unit, and when the information regarding the defective conveyance which is received from the image forming control unit is information showing the occurrence of specific defective conveyance, the image processing control unit transmits a defective conveyance cancelling signal to cancel the specific defective conveyance to the image forming control unit.

These and other objects, features and advantages of the present invention will become more apparent upon reading of the following detailed description along with the accompanied drawings.

DETAILED DESCRIPTION OF THE PREFERRED EMBODIMENTS

First Embodiment

The first embodiment of the invention will now be described with reference to FIGS. 1 to 5.

Figure 1:
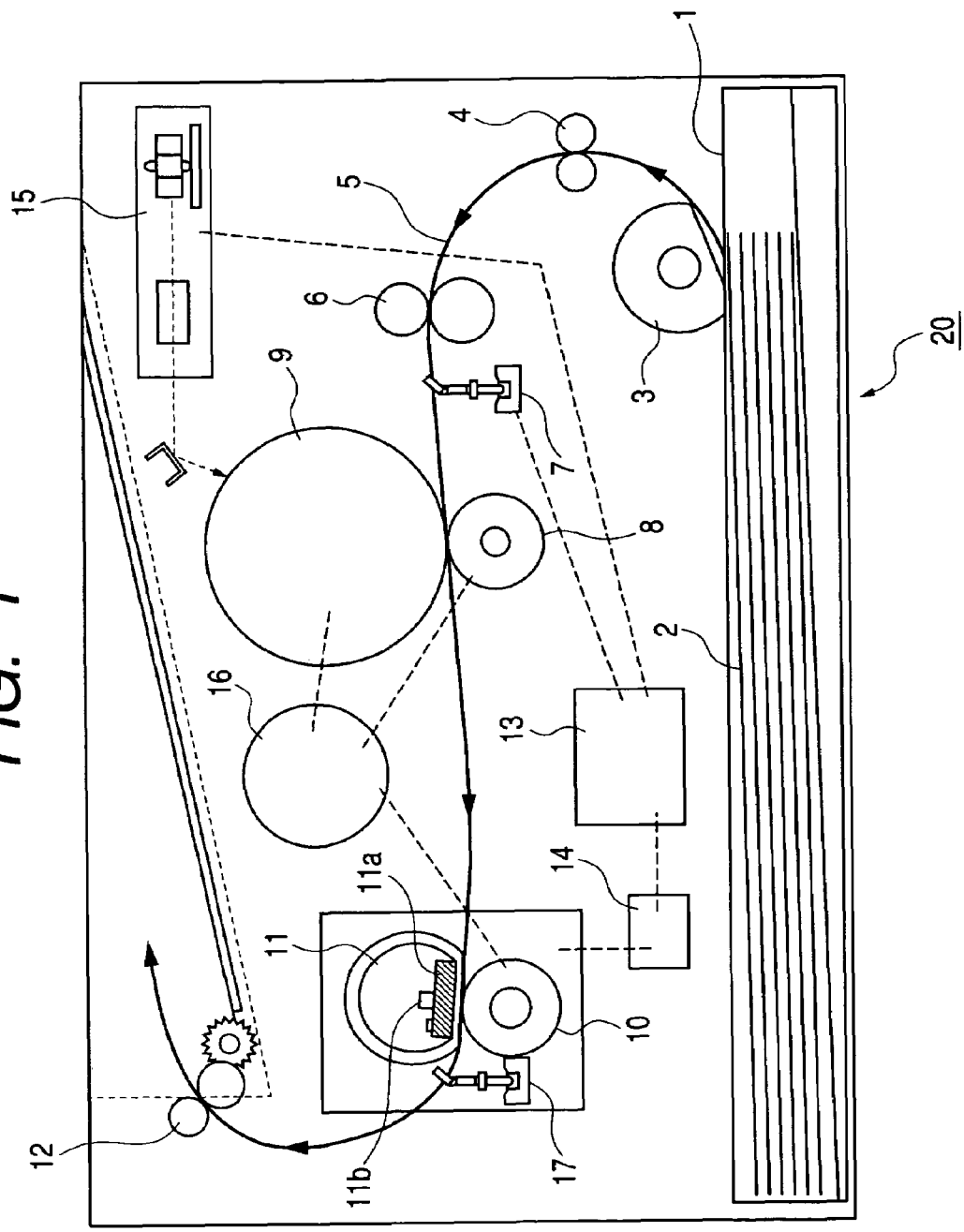
FIG. 1 is a cross sectional view showing a schematic construction of a printer.

FIG. 1 is a diagram for explaining the first embodiment of the invention and is a cross sectional view showing a schematic construction of a printer 20 as an image forming apparatus.

Reference numeral 1 denotes a paper feed cassette; 2 a sheet material; 3 a cassette feed roller; 4 a conveying roller; 5 a sheet material conveying path; 6 a registration roller; 7 a TOP sensor as one of detecting sensors for detecting the presence or absence of the sheet material 2; 8 a transfer roller; 9 a photosensitive drum; 10 a pressing roller; 11 a pressing roller; 11a a ceramics heater; 11b a thermistor; 12 an ejection roller; 13 a CPU as discriminating means; 14 a heater driving circuit; 15 a scanner unit (or scanner motor); 16 a main motor; 17 an ejection sensor as one of detecting means; and 20 a printer as an image forming apparatus.

The printer 20 shown in FIG. 1 is a printer using an electrophotographic system and forms a toner image onto the sheet material 2 by the operation, which will be explained hereinafter.

Figure 2:
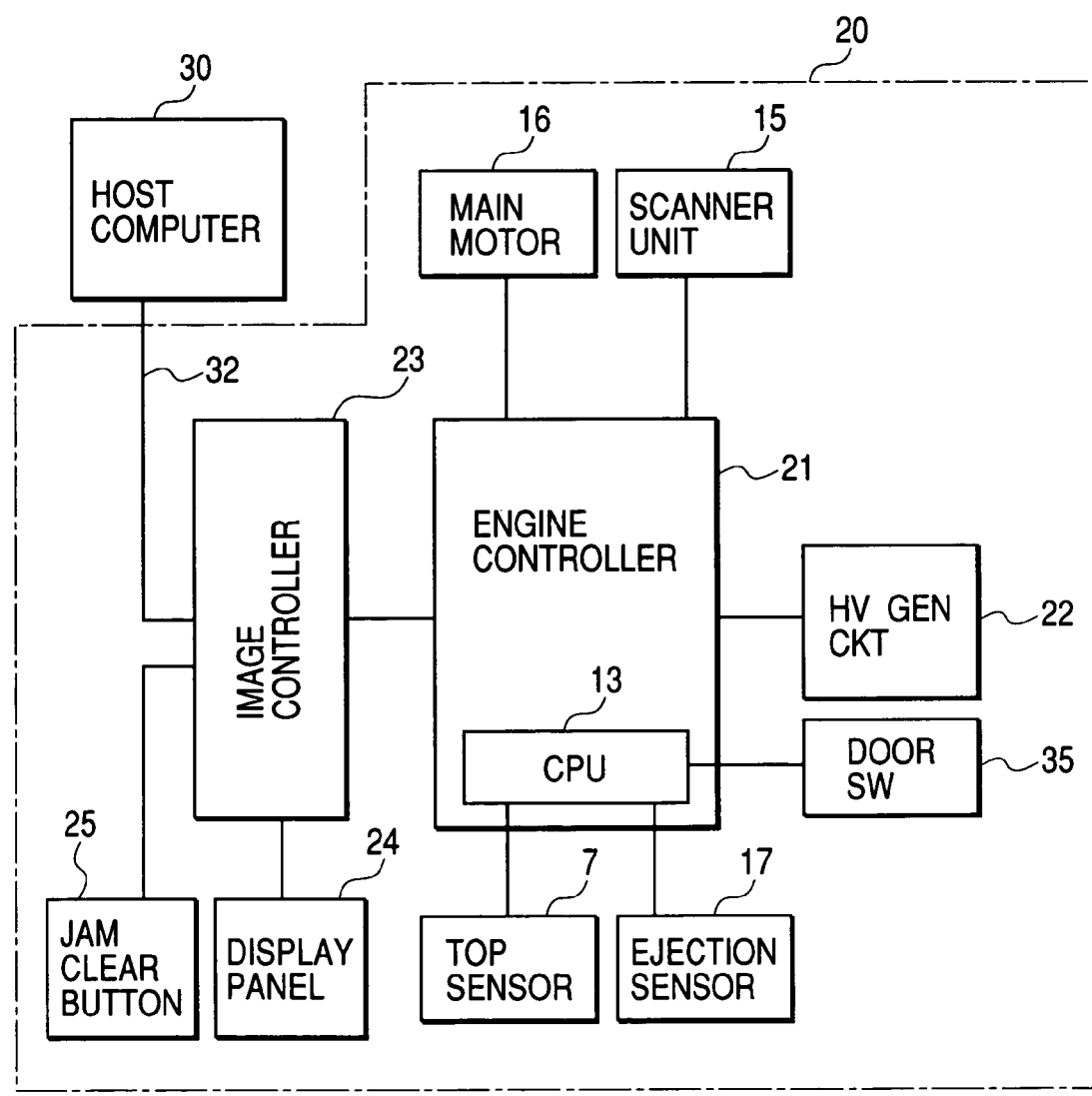
FIG. 2 is a block diagram showing a control construction of the printer.

FIG. 2 is a block diagram showing a schematic construction of the printer in the first embodiment.

In addition to each unit constructing the printer 20, a host computer 30 as an external apparatus for transmitting an image signal or the like to be printed by the printer 20 is also shown in FIG. 2.

In FIG. 2, reference numeral 21 denotes an engine controller for controlling each unit constructing the printer 20.

In the printer 20 according to the first embodiment, the CPU 13 is provided in the engine controller 21.

Reference numeral 22 denotes a high voltage generating circuit, that is, a circuit for applying a high voltage to a charging roller (not shown) for charging the surface of the photosensitive drum 9 to a predetermined electric potential, a developing roller (not shown) for developing an electrostatic latent image formed on the photosensitive drum 9 with toner, the transfer roller 8 for transferring the toner image formed on the photosensitive drum 9 onto the sheet material 2, and the like.

Reference numeral 23 denotes an image controller for receiving image information and a print command which are transmitted from the host computer, executing a developing process or the like for developing the image information into bit data suitable for forming an image by the printer 20, and transmitting a print start command as a control signal to execute printing according to the image signal together with the developed bit data to the engine controller 21.

Reference numeral 24 denotes a display panel for allowing the printer 20 to display a message for the operator (user).

As means for displaying the message for the operator (user), besides the foregoing display panel 24, the message can be also displayed onto a display screen of a display or the like of the host computer 30 connected to the image controller 23. In this case, an image forming system is constructed by the printer 20 and the host computer 30 (refer to FIGS. 4 and 5).

Figure 4:
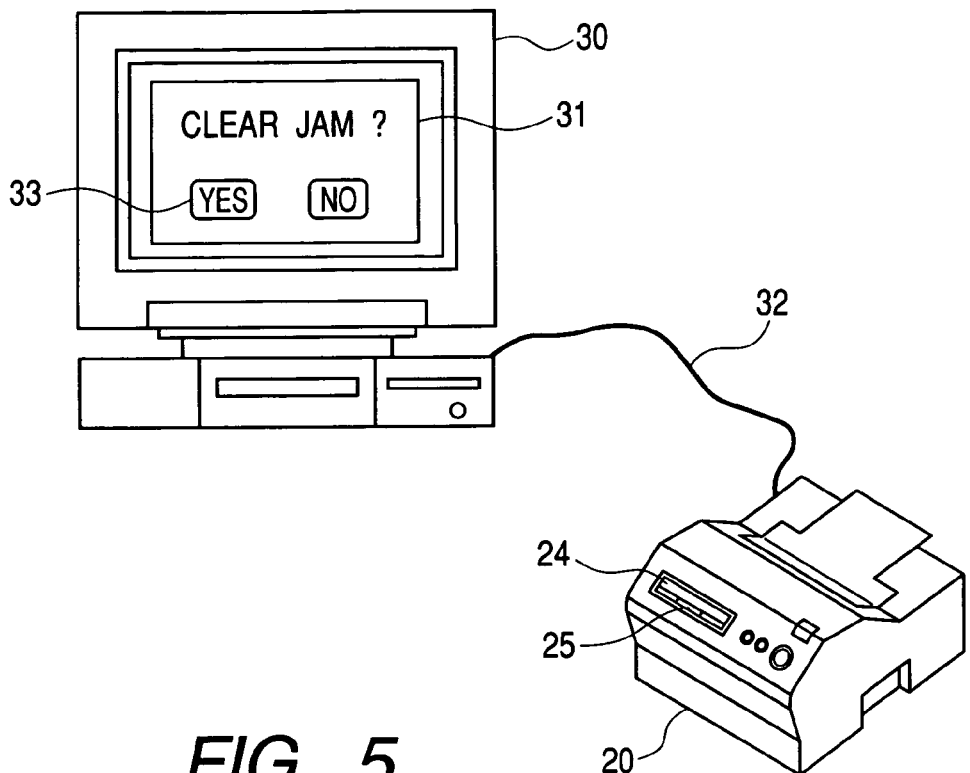
FIG. 4 is a diagram showing a message which is displayed on a display screen of a host computer in the case where a feed delay jam occurs.
Figure 5:
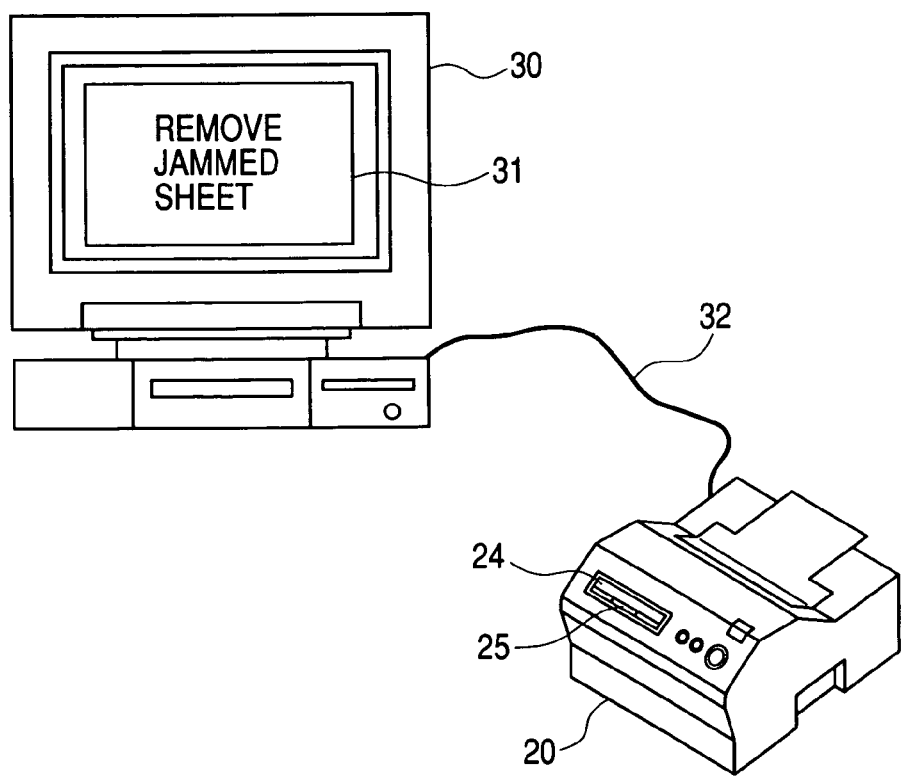
FIG. 5 is a diagram showing a message which is displayed on the display screen of the host computer in the case where a jam other than the feed delay jam occurs.

In FIGS. 4 and 5, reference numeral 25 denotes a jam clear button connected to the image controller 23 and 30 indicates the host computer which has a display screen 31 and controls the display of the display screen 31. Reference numeral 32 denotes a communication line for making communication between the host computer 30 and the image controller 23 of the printer 20 and 33 indicates a jam clear button which is provided on the display screen of the host computer 30. The jam clear button on the display screen of the host computer 30 can be constructed in a manner such that the display screen is designed as a touch panel type to thereby allow the operator (user) to directly press a button portion on the display screen or the operator (user) indirectly presses the button portion on the display screen by using a pointing device such as a mouse or the like provided for the host computer 30.

As described above, the display panel 24 and the jam clear button 25 are provided for the printer 20 and the jam clear button 33 is provided for the host computer 30.

When the jam clear button 25 of the printer 20 is pressed by the operator (user), information showing that the jam clear button 25 has been pressed is inputted to the image controller 23. In response to the depression of the jam clear button, the image controller 23 transmits a jam clear command as a command to instruct the cancellation of the defective conveyance (jam) to the CPU 13 or the engine controller 21.

When the jam clear button 33 on the display screen 31 of the host computer 30 is pressed, the host computer 30 transmits the jam clear command to the image controller 23 via the communication line 32. In response to the depression of the jam clear button, the image controller 23 further transmits the jam clear command as a command to instruct the cancellation of the defective conveyance (jam) to the CPU 13 or the engine controller 21.

Reference numeral 35 denotes a door switch for detecting an opening/closing state of a closable door in order to access the inside of the printer 20.

A series of printing operation in which the printer 20 forms a toner image onto the sheet material 2, thermally fixes it thereon, and ejects the sheet material to the outside of the printer 20 will now be described. The engine controller 21, which will be explained hereinafter, mainly executes the printing operation of the printer 20.

First, the image controller 23 receives a print command as a command to print from the host computer 30 together with the image information to be printed. The image controller 23 executes a developing process or the like for developing the image information into bit data suitable for forming an image and transmits a print start command as a control signal to print according to the image signal to the engine controller 21 together with the developed bit data.

The engine controller 21 which received the print start command from the image controller 23 allows the cassette feed roller 3 to feed the sheet material 2 stacked into the paper feed cassette 1 and further allows the conveying roller 4 to feed the sheet material 2 onto the sheet material conveying path 5 in the printer 20.

Subsequently, the CPU 13 of the engine controller 21 discriminates whether a front edge (or leading end) of the sheet material 2 is detected by the TOP sensor 7 or not.

When the TOP sensor 7 detects the front edge of the sheet material 2, the engine controller 21 starts the creation of the electrostatic latent image onto the photosensitive drum 9 so that the position of the front edge of the sheet material 2 conveyed by the registration roller 6 and the position of a front edge of the toner image which is transferred onto the sheet material 2 satisfy a desired positional relation.

The engine controller 21 starts the creation of the electrostatic latent image onto the photosensitive drum 9 by exposing the surface of the photosensitive drum 9 by a laser beam by the scanner unit 15 and allows a developing roller (not shown) to develop the electrostatic latent image with toner. The engine controller 21 transfers the toner image on the photosensitive drum 9 by applying a transfer voltage to the transfer roller 8 from the high voltage generating circuit 22, thereby transferring the toner image on the photosensitive drum 9 to the sheet material 2.

The engine controller 21 conveys the toner to the pressing roller 10, fixing film 11, and ceramics heater 11*a* for fixing the toner onto the sheet material 2, pressure-fixes the toner onto the sheet material 2, and thereafter, allows the sheet material to be ejected to the outside of the printer 20 by the ejection roller 12.

The ejection sensor 17 detects whether the sheet material 2 has been ejected or not.

The thermistor 11*b* detects a temperature of the ceramics heater 11*a* and transfers a signal indicative of the detected temperature to the CPU 13. The CPU 13 controls the temperature of the ceramics heater 11*a* by controlling the heater driving circuit 14.

For a period of time during which the sheet material 2 passes the ceramics heater 11*a*, the CPU 13 makes control so that an applying electric power is increased by a heat quantity which is applied to the paper, thereby controlling the ceramics heater 11*a* so as to keep a predetermined temperature.

The main motor 16 drives the transfer roller 8, the photosensitive drum 9, and the pressing roller 10.

The control operation in the case where a jam of the recording paper occurs in the first embodiment of the invention will now be described with reference to a flowchart of FIG. 3.

Figure 3:
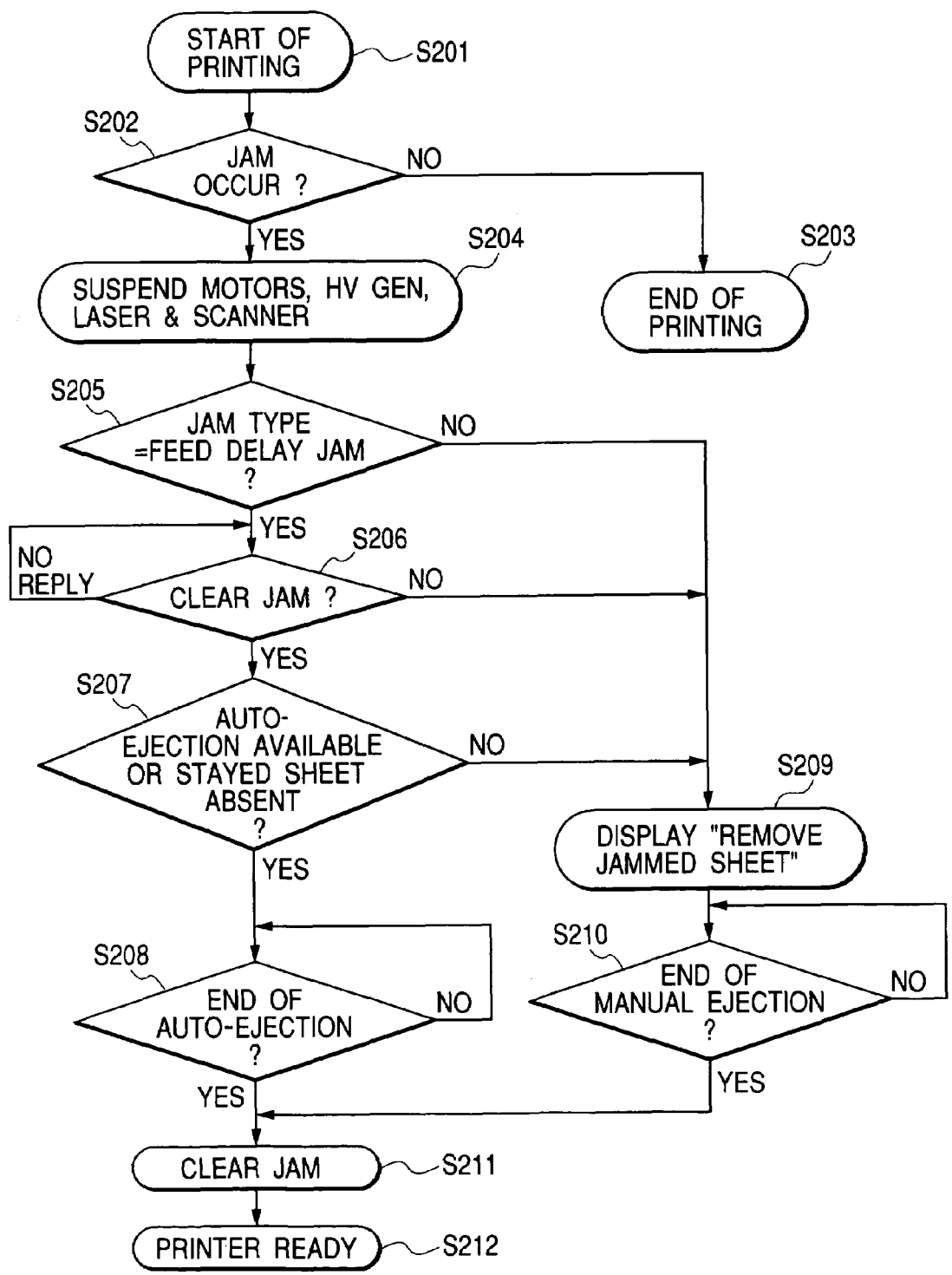
FIG. 3 is a flowchart showing the control operation in the case where a jam of recording paper occurs.

The flowchart of FIG. 3 shows the operation which is mainly executed by the image controller 23 and the engine controller 21 provided for the printer 20.

In FIG. 3, by receiving the print start command from the image controller 23, the engine controller 21 starts the printing (step S201).

Subsequently, the CPU 13 of the engine controller 21 monitors whether defective conveyance (jam) occurs or not with respect to the sheet material 2 fed by the cassette feed roller 3 from the sheet materials 2 stacked in the paper feed cassette 1 (S202).

It is assumed that the CPU 13 of the engine controller 21 discriminates a plurality of types of defective conveyance (jams) in S202. First, if the front edge of the sheet material 2 is not detected by the TOP sensor 7 within a predetermined time after the sheet material 2 was fed by the cassette feed roller 3, it is regarded that the arrival of the fed sheet material 2 at the TOP sensor 7 has been delayed, so that the CPU 13 determines that "feed delay jam" has occurred. The processing routine advances to S204.

In S202, if the TOP sensor 7 does not detect a rear edge (or tail end) of the sheet material 2 before the elapse of a predetermined time after the TOP sensor 7 detected the front edge of the sheet material 2, it is regarded that the sheet material 2 is staying in the position detected by the TOP sensor 7, so that the CPU 13 of the engine controller 21 determines that "TOP sensor staying jam" has occurred. The processing routine advances to step S204.

If the ejection sensor 17 does not detect the front edge of the sheet material 2 before the elapse of a predetermined time (time longer than the predetermined time for discriminating the "TOP sensor staying jam") after the TOP sensor 7 detected the front edge of the sheet materials 2, it is regarded that the arrival of the sheet material 2 at the ejection sensor 17 has been delayed, so that the CPU 13 of the engine controller 21 determines in S202 that "ejection sensor front edge delay jam" has occurred. The processing routine advances to step S204.

In S202, if the ejection sensor 17 does not detect the rear edge of the sheet material before the elapse of a predetermined time after the ejection sensor 17 detected the front edge of the sheet materials 2, it is regarded that the sheet material 2 is staying in the position detected by the ejection sensor 17, so that the CPU 13 of the engine controller 21 determines that "ejection sensor staying jam" has occurred. The processing routine advances to step S204.

If the CPU 13 of the engine controller 21 determines in S202 that none of "feed delay jam", "TOP sensor staying jam", "ejection sensor front edge delay jam", and "ejection sensor staying jam" occurs, the printing is finished (S203).

In S204, in response to the discrimination result of the CPU 13, the engine controller 21 immediately suspends the rotation of the motors, that is, the conveyance of the sheet material 2, the generation of the high voltage, the rotation of a fan for cooling the inside of the printer 20, the rotation of a scanner motor for rotating a polygon motor in the scanner unit 15, the light emission of a laser in the scanner unit 15, and the like via the scanner unit 15, main motor 16, and high voltage generating circuit 22.

The CPU 13 communicates with the image controller 23 and the host computer 30 connected via the image controller 23 and notifies them of the type of jam detected at this time (one of "feed delay jam", "TOP sensor staying jam", "ejection sensor front edge delay jam", and "ejection sensor staying jam") as status information. The image controller 23 displays a message onto the display panel 24 or the host computer 30 displays the message onto the display screen 31 such as a CRT or the like provided for the host computer 30 in accordance with the notified jam type (S205), respectively.

Specifically speaking, on the basis of the status information showing the jam type notified from the CPU 13, in S205, the image controller 23 discriminates whether the jam occurring in the printer 20 is a specific jam ("feed delay jam" here) or not.

If the jam type shown by the status information notified to the image controller 23 by the CPU 13 is "feed delay jam", the processing routine advances to S206. The image controller 23 displays a selecting display screen for clearing the jam by the auto-ejection onto the display screen 31 of the host computer 30 (refer to FIG. 4). The image controller 23 also displays a display screen for inquiring about whether the jam is cleared by the auto-ejection or not onto the display panel 24. Either a mode to execute both of the display onto the display panel 24 and the display by the host computer 30 or a mode to execute one of them can be arbitrarily selected.

If the jam type notified to the image controller 23 by the CPU 13 is one of "TOP sensor staying jam", "ejection sensor delay jam", and "ejection sensor staying jam" other than "feed delay jam", the processing routine advances to S209. The image controller 23 displays a message onto the display screen 31 of the host computer 30 so as to urge the operator (user) to execute the jam process by manual paper ejection (refer to FIG. 5). The image controller 23 also displays the message onto the display panel 24 so as to urge the operator (user) to execute the jam process by the manual paper ejection. Either the mode to execute both of the display onto the display panel 24 and the display by the host computer 30 or the mode to execute one of them can be arbitrarily selected.

In S206, if the jam clear button 25 or 33 is pressed and the mode to execute the auto-ejection of the sheet material 2 in the defective conveyance (jam) is selected by the operator (user), an input signal indicative of the depression of the jam clear button 25 or 33 is inputted to the image controller 23.

When such an input signal is inputted, the image controller 23 generates the jam clear command for cancelling the suspension of the rotation of the main motor 16 due to the defective conveyance (jam), the suspension of the generation of the high voltage by the high voltage generating circuit 22, and the like, and transmits the jam clear command to the CPU 13 or the engine controller 21, and S207 follows.

Although the input signal is inputted at arbitrary timing from the jam clear button 25 to the image controller 23 by the operation of the operator, the jam clear command is transmitted from the image controller 23 to the CPU 13 or the engine controller 21 only in the case where the specific defective conveyance ("feed delay jam" here) has occurred in the printer 20.

If the mode in which the auto-ejection is not executed is selected in S206, S209 follows.

If none of the jams is selected in S206, the apparatus enters a standby mode (it is also possible to construct the apparatus in a manner such that if a predetermined time elapses in the standby mode, it is regarded that one of the jams has been selected, and the processing routine advances to the next step).

In S207, the CPU 13 discriminates whether no sheet material 2 is staying in the printer 20 or the auto-ejection is available or not.

Figure 6:
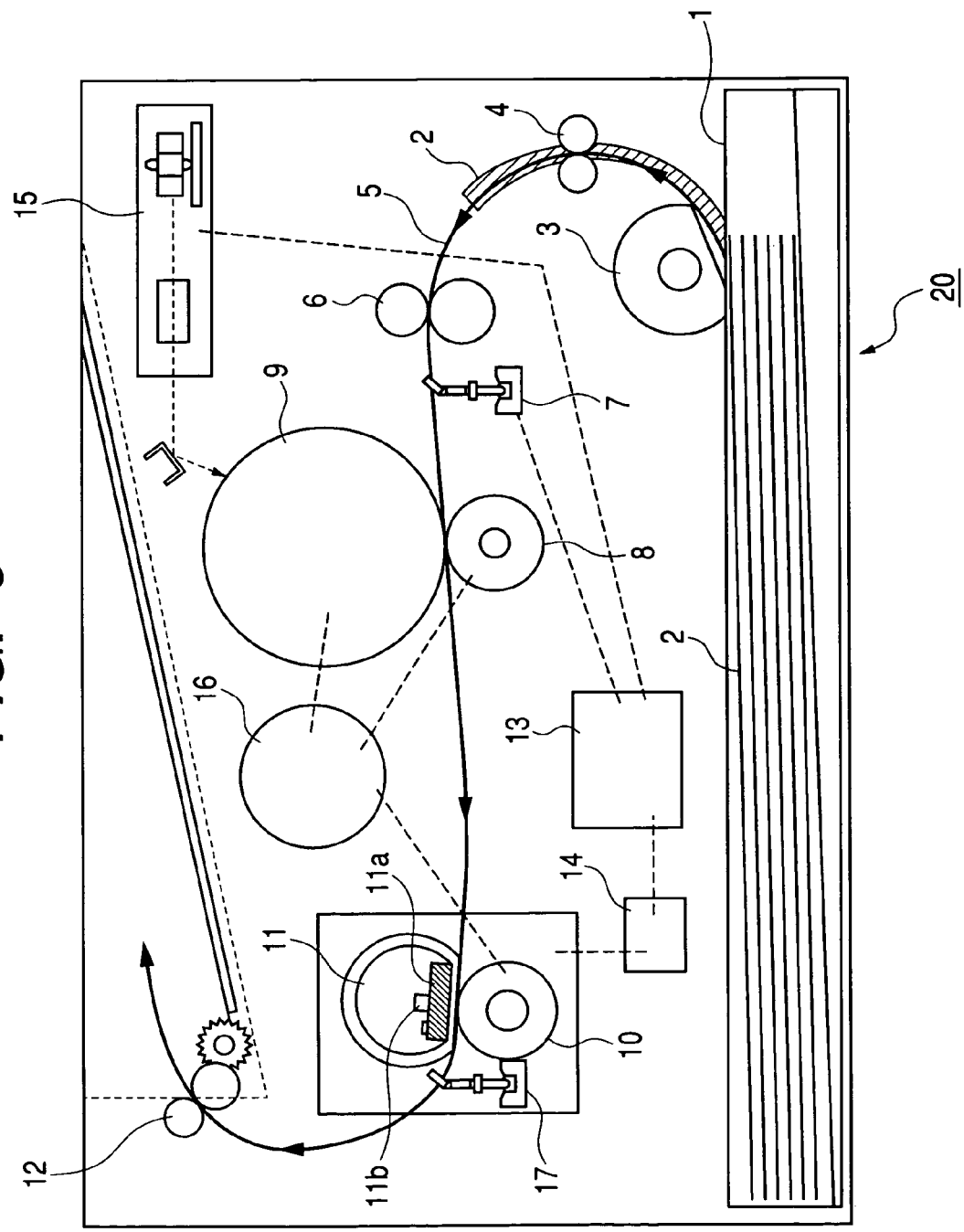
FIG. 6 is a view showing that a suspended sheet material exists between a cassette feed roller and a registration roller.
Figure 7:
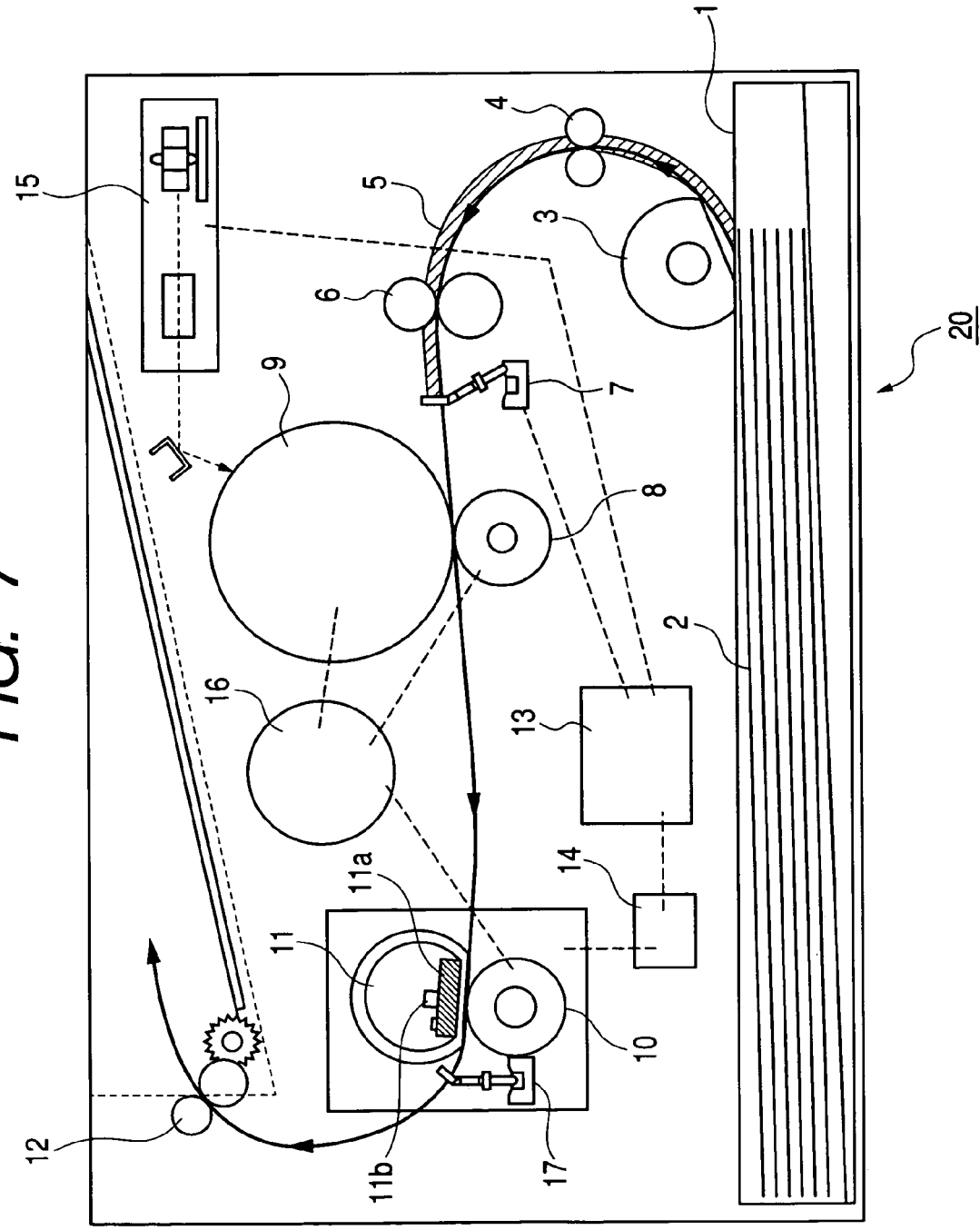
FIG. 7 is a view showing that a TOP sensor detects a front edge of the sheet material before the elapse of a predetermined time after the start of the initializing operation.

S207 will be described in detail. By receiving the jam clear command from the image controller 23, the CPU 13 starts the initializing operation to start the rotation of the main motor 16 or the generation of the high voltage by the high voltage generating circuit 22. In the initializing operation, a driving force is applied to the conveying roller 4 and the registration roller 6 by the main motor 16, so that the sheet material 2 is rotated. In S204, if the suspended sheet material 2 exists between the cassette feed roller 3 and the registration roller 6 (FIG. 6), the TOP sensor 7 detects the front edge of the sheet material 2 before the elapse of a predetermined time after the start of the initializing operation (FIG. 7).

If the TOP sensor 7 detects the front edge of the sheet material 2 before the elapse of a predetermined time after the start of the initializing operation as mentioned above, it is determined that the sheet material 2 which became a cause of "feed delay jam" can be automatically ejected.

If the TOP sensor 7 and the ejection sensor 17 do not detect the sheet material 2 when the predetermined time elapses after the start of the initializing operation, it is determined that the staying sheet material does not exist in the printer 20.

If the CPU 13 determines that the staying sheet material 2 does not exist in the printer 20 or the sheet material 2 which became the cause of "feed delay jam" can be automatically ejected, S208 follows.

If the CPU 13 determines that the staying sheet material 2 exists in the printer 20 or the sheet material 2 which became the cause of "feed delay jam" cannot be automatically ejected, S209 follows.

In S208, if the jam occurring in the printer 20 is a jam in which the sheet can be automatically ejected, the auto-ejection is finished and, thereafter, S211 follows.

In S209, a message for urging the user to manually open the cover of the image forming apparatus and execute the jam process is displayed and S210 follows.

The case where the jam type indicates "ejection delay jam" will be first explained.

If the status information indicative of "ejection delay jam" has been transmitted to the image controller 23 in this instance, the image controller 23 determines that the jam type is other than "feed delay jam" in S206 in the flowchart of FIG. 3, and step S209 follows. Therefore, a display screen for inquiring about whether the jam is cleared by the auto-ejection or not is not displayed on the display panel 24 provided for the printer 20. Therefore, the jam clear command is not transmitted to the engine controller 21 from the image controller 23, so that the auto-ejection is not executed.

If the status information indicative of "ejection delay jam" has been transmitted to the host computer 30 via the image controller 23, the image controller 23 determines that the jam type is other than "feed delay jam" in S206 in the flowchart of FIG. 3, and step S209 follows. Therefore, the selecting display screen for clearing the jam by the auto-ejection is not displayed on the display screen 31 of the host computer 30. Therefore, the jam clear command is not transmitted to the engine controller 21 from the host computer 30 via the image controller 23, so that the auto-ejection is not executed.

This is because if the user does not execute the jam process but the CPU 13 or the engine controller 21 receives the jam clear command from the image controller 23 and/or the host computer 30 and tries to execute the auto-ejection, there is a possibility of occurrence of the following problem.

Since "ejection delay jam" is defective conveyance in the case where the TOP sensor 7 detects the front edge of the sheet material 2 and the ejection sensor 17 does not detect the front edge of the sheet material 2 before the elapse of a predetermined time, a case where the front edge of the sheet material 2 is wound around a fixing device (fixing film 11 or pressing roller 10) is considered as a feature. There is a possibility that if the auto-ejection is started in such a state, the sheet material 2 is further wound around the fixing device and a jam in which even through the operator (user) opens the cover of the printer 20, he cannot remove the jammed sheet material 2 (hereinafter, referred to as "unclearable jam") occurs.

Therefore, in the case of "ejection delay jam", it is determined that the auto-ejection is not available. The auto-ejection is not executed but the operator (user) manually opens the cover of the printer 20 and removes the jammed sheet material 2. In response to the closure of the cover, the engine controller 21 clears the jam.

Although "ejection delay jam" has been described above, also in the case of "ejection sensor staying jam" or "TOP sensor staying jam", there is a possibility that "unclearable jam" occurs in a manner similar to "ejection delay jam". Therefore, even if the image controller 23 transmits the jam clear command to the CPU 13, the CPU 13 does not execute the auto-ejection.

In S210, the CPU 13 discriminates whether the manual-ejection has been finished or not by detecting the opening/closing state of the door switch 35. If the opening/closing state of the door switch is switched from the opening state to the closing state and the end of the manual-ejection is confirmed, S211 follows.

In S211, the jam is cleared on the assumption that the jam occurred in S202 has been cancelled.

By clearing the jam, a control mode of the engine controller 21 of the printer 20 enters a ready mode (S212) and the printer enters a state where the printing can be restarted.

By making such control, in the case of the specific jam such as "feed delay jam" such that the sheet material can be conveyed and ejected to the outside of the image forming apparatus without opening/closing the cover of the image forming apparatus, the jam can be cleared merely by pressing the jam clear button 25 or 33 on the display panel 24 and/or the display screen of the host computer 30 by the operator (user).

Consequently, the user-friendly image forming apparatus, image forming system, control method of the image forming apparatus, and control method of the image forming system can be provided for the user.

Even in the case of "feed delay jam", it is also possible to construct the apparatus in a manner such that if the user opens/closes the door during the processing sequence (for example, the case where the user manually removes the sheet material 2, or the like), the processing routine advances to S207 or S210.

Second Embodiment

The second embodiment will now be described.

In the first embodiment, if the CPU 13 notifies the display panel 24 and/or the host computer 30 of "feed delay jam", in place of the user's depression of the jam clear button 25 or 33 on the display panel 24 and/or the host computer 30 (YES in S206), a driver (printer driver or the like) on the display panel 24 and/or the host computer 30 automatically determines that the apparatus is in the "feed delay jam" state and transmits the jam clear command.

In the first embodiment, it is also possible to construct in a manner such that if the CPU 13 determines that the apparatus is in the "feed delay jam" state (YES in S205), the procedure (S206) in which the user depresses the jam clear button 25 or 33 on the display panel 24 and/or the display screen of the host computer 30 is omitted and the CPU 13 or the engine controller 21 automatically discriminates whether there is no staying sheet in the printer or the auto-ejection is available (S207).

By controlling as mentioned above, it is possible to provide the user-friendly image forming apparatus, image forming system, control method of the image forming apparatus, and control method of the image forming system in which in the case of the specific jam such as "feed delay jam", the jam can be automatically cleared without troubling the user.

Although the example in which the troublesomeness of the user is omitted in the case of "feed delay jam" has been described in the embodiments 1 and 2, the invention is not limited to only such an example. Naturally, with respect to another type of jam which does not need the jam process which is manually executed by the user, the process can be similarly automatically executed.

As mentioned above, it is possible to provide the user-friendly image forming apparatus, image forming system, control method of the image forming apparatus, and control method of the image forming system in which the occasion for the user to bother to execute the jam process can be reduced.

That is, it is possible to provide the image forming apparatus, image forming system, control method of the image forming apparatus, and control method of the image forming system in which in the case of the specific jam, the user can clear the jam merely by pressing the jam clear button.

It is also possible to provide the image forming apparatus, image forming system, control method of the image forming apparatus, and control method of the image forming system in which in the case of the specific jam, the driver on the display panel and/or the host computer automatically transmits the jam clear command in place of the iuser's depression of the jam clear button, so that the jam can be automatically cleared without troubling the user.

Further, it is possible to provide the image forming apparatus, image forming system, control method of the image forming apparatus, and control method of the image forming system in which in the case of the specific jam, by automatically clearing the jam on the basis of the discrimination result of the CPU or the engine controller, the user is not troubled.

The present invention is not limited to the foregoing embodiments but many modifications and variations are possible within the spirit and scope of the appended claims of the invention.

What is claimed is:

1. An image forming apparatus which forms an image onto recording paper, comprising:
    an image processing control unit for processing image information from an external apparatus;
    an image forming control unit for controlling said image forming apparatus on the basis of a control signal from said image processing control unit;
    a conveying unit for conveying the recording paper; and
    a detecting unit for outputting information regarding the presence or absence of the recording paper which is conveyed by said conveying unit,
    wherein said image forming control unit discriminates defective conveyance of said recording paper on the basis the information regarding the presence or absence of said recording paper which is outputted from said detecting unit, discriminates which of a plurality of types of defective conveyance said defective conveyance is, and transmits information regarding the defective conveyance to said image processing control unit, and
    when the information regarding said defective conveyance which is received from said image forming control unit is information showing the occurrence of specific defective conveyance, said image processing control unit transmits a defective conveyance cancelling signal to cancel said specific defective conveyance to said image forming control unit.

2. An apparatus according to claim 1, wherein said image forming control unit suspends the conveyance of the recording paper by said conveying unit in accordance with the determination of the defective conveyance of said recording paper and starts the conveyance of the recording paper by said conveying unit in accordance with reception of said defective conveyance cancelling signal from said image processing control unit.

3. An apparatus according to claim 1, further comprising an input unit for inputting a predetermined instruction signal to said image processing control unit in order to transmit said defective conveyance cancelling signal from said image processing control unit to said image forming control unit,
    wherein said image processing control unit transmits said defective conveyance cancelling signal from said image processing control unit to said image forming control unit in response to said predetermined instruction signal being inputted to said image processing control unit by said input unit.

4. An apparatus according to claim 3, further comprising a display unit for displaying the information regarding the defective conveyance transmitted to said image processing control unit from said image forming control unit.

5. An apparatus according to claim 1, further comprising a stacking unit for stacking said recording paper,
    wherein said conveying unit feeds said recording paper stacked in said stacking unit, and
    said image forming control unit determines that said specific defective conveyance has occurred in the case where said recording paper is not detected by said detecting unit even after the elapse of a predetermined paper feed delay time after the start of the paper feed of said recording paper from said stacking unit, and transmits the information regarding said specific defective conveyance to said image processing control unit.

6. An apparatus according to claim 2, wherein said image forming control unit controls said conveying unit so as to eject said recording paper in the case where said detecting unit detects the recording paper regarding said specific defective conveyance before the elapse of a predetermined initial operating period of time after the start of the conveyance of said recording paper after the reception of said defective conveyance cancelling signal from said image processing control unit.

7. An image forming system having an image forming apparatus which forms an image onto recording paper and an input apparatus which transmits image information to said image forming apparatus, comprising:
    an image processing control unit for processing the image information from said input apparatus;
    an image forming control unit for controlling said image forming apparatus on the basis of a control signal from said image processing control unit;
    a conveying unit for conveying the recording paper; and a detecting unit for outputting information regarding the presence or absence of the recording paper which is conveyed by said conveying unit, wherein said image forming control unit discriminates defective conveyance of said recording paper on the basis the information regarding the presence or absence of said recording paper which is outputted from said detecting unit, discriminates what of a plurality of types of defective conveyance said defective conveyance is, and transmits information regarding the defective conveyance to said image processing control unit, and when the information regarding said defective conveyance which is received from said image forming control unit is information showing the occurrence of specific defective conveyance and a predetermined instruction signal to cancel said specific defective conveyance is inputted from said input apparatus, said image processing control unit transmits a defective conveyance cancelling signal to cancel said specific defective conveyance to said image forming control unit.

8. A system according to claim 7, wherein said image forming control unit suspends the conveyance of the recording paper by said conveying unit in accordance with the determination of the defective conveyance of said recording paper and starts the conveyance of the recording paper by said conveying unit in accordance with reception of said defective conveyance cancelling signal.

9. A system according to claim 7, wherein said input apparatus has a display unit for displaying the information regarding the defective conveyance transmitted from said image forming control unit via said image processing control unit.

10. A system according to claim 7, wherein said image forming apparatus has a stacking unit for stacking said recording paper, said conveying unit feeds said recording paper stacked in said stacking unit, and said image processing control unit determines that said specific defective conveyance has occurred in the case where said recording paper is not detected by said detecting unit even after the elapse of a predetermined paper feed delay time after the start of the paper feed of said recording paper from said stacking unit, and transmits the information regarding said specific defective conveyance to said image processing control unit.

11. A system according to claim 8, wherein said image forming control unit controls said conveying unit so as to eject said recording paper in the case where said detecting unit detects the recording paper regarding said specific defective conveyance before the elapse of a predetermined initial operating period of time after the start of the conveyance of said recording paper after the reception of said defective conveyance cancelling signal from said image processing control unit.

12. A controller of an image forming apparatus which forms an image onto recording paper, comprising:

a discriminating unit for discriminating whether a plurality of types of defective conveyance of recording paper which occurs in the image forming apparatus is a specific type of defective conveyance or not;

an input unit to which an input signal to cancel said defective conveyance which occurs in the image forming apparatus is inputted; and a generating unit for generating a cancelling signal for cancelling said specific defective conveyance when said input signal is inputted to said input unit and when said discriminating unit determines the occurrence of said specific type of defective conveyance.

* * * * *

UNITED STATES PATENT AND TRADEMARK OFFICE
CERTIFICATE OF CORRECTION

PATENT NO. : 7,382,472 B2
APPLICATION NO. : 10/782780
DATED : June 3, 2008
INVENTOR(S) : Wada Page 1 of 1

It is certified that error appears in the above-identified patent and that said Letters Patent is hereby corrected as shown below:

COLUMN 2:
Line 29, "occurs; and" should read --occurs;--.
Line 32, "occurs." should read --occurs;--.
Line 34, "roller." should read --roller; and--.

COLUMN 3:
Line 31, "be also" should read --also be--.

COLUMN 9:
Line 39, "iuser's" should read --user's--.
Line 67, "basis" should read --basis of--.

COLUMN 11:
Line 6 Claim 7, "basis" should read --basis of--.

Signed and Sealed this

Thirtieth Day of December, 2008

JON W. DUDAS
*Director of the United States Patent and Trademark Office*